United States Patent [19]

Belanger

[11] Patent Number: 4,579,613

[45] Date of Patent: Apr. 1, 1986

[54] METHOD FOR MANUFACTURING OF A MOLDED DOOR

[76] Inventor: Fernand Belanger, 510 Du Chenal, Repentigny, Quebec, Canada, J6A 2Z7

[21] Appl. No.: 605,884

[22] Filed: May 1, 1984

[51] Int. Cl.$^4$ .......................... B29D 27/00; B32B 1/04; B32B 5/20
[52] U.S. Cl. ...................................... 156/78; 156/228; 156/244.27; 264/292; 52/309.8; 52/311; 52/313; 52/316; 52/456; 52/457; 52/458
[58] Field of Search ...................... 52/309.8, 455, 456, 52/457, 458, 311, 313, 316; 264/292; 156/71, 78, 228, 244.27

[56] References Cited

U.S. PATENT DOCUMENTS

| | | | |
|---|---|---|---|
| 3,720,032 | 3/1973 | Harman | 52/458 X |
| 4,236,365 | 12/1980 | Wheeler | 428/81 X |
| 4,238,544 | 12/1980 | Mullet | 52/458 X |
| 4,242,406 | 12/1980 | El Bouhnini et al. | 52/309.14 X |
| 4,265,067 | 5/1981 | Palmer | 52/309.9 |
| 4,284,447 | 8/1981 | Dickens et al. | 52/309.14 X |

FOREIGN PATENT DOCUMENTS

45028/72 1/1974 Australia ............................... 52/455

*Primary Examiner*—Thurman K. Page
*Attorney, Agent, or Firm*—Robic, Robic & Associates

[57] ABSTRACT

A door having an improved design is provided, which improved design consisting of a door frame made of a rigid material, a first skin mounted on this frame and forming a first face of the door, and a second skin also mounted on the frame and forming a second face of the door. One of the first and second skins comprises a portion thereof which constitutes at least in part the peripheral edge of the door. In this design, at least one of the first and second skins is made of moldable material and is shaped by vacuum forming to provide the corresponding face of the door with decorative patterns, which decorative patterns as well as the door frame being designed so that the shaped skin can be mounted on the frame. Any empty space between the two skins of the door may be filled with a convenient material, thereby increasing the rigidity of the door. The two skins mounted on the frame may be jointed together through a heating process, the material forming these skins being in this case selected to be convenient for this purpose.

12 Claims, 1 Drawing Figure

METHOD FOR MANUFACTURING OF A MOLDED DOOR

BACKGROUND OF THE INVENTION

1. Field of the Invention

The present invention relates to a door formed with a rigid frame and with two skins wrapping this frame, at least one of these skins being molded to provide the door with decorative patterns. The present invention also relates to a method for constructing such a door.

2. Brief Description of the Prior Art

Conventional doors with decorative patterns thereon are usually made of wood. The provision of such decorative patterns necessitates an important work of the pieces of wood forming the door as well as an accurate assembling of these wood pieces together, thereby increasing the manufacturing cost of such conventional wood doors.

SUMMARY OF THE INVENTION

An object of the present invention is therefore to provide a door design in which the door can be provided very easily with a great variety of decorative patterns, and in which the assembling of the door requires only a few operations.

More particularly, according to the present invention, there is provided a door having a first face, a second face and a peripheral edge, comprising:

a door frame made of a rigid material;

a first skin mounted on this frame and forming the first face of the door; and a second skin also mounted on the door frame and forming the second face of the door;

wherein at least one of the first and second skins comprises a portion thereof which constitutes at least in part said peripheral edge of the door; and wherein at least one of the first and second skins is made of a moldable material and is shaped by vacuum forming to provide the corresponding face of the door with decorative patterns, these decorative patterns as well as the door frame being designed so that the vacuum forming shaped skin can be mounted on the door frame.

According to the present invention there is also provided a method for constructing a door having a first face, a second face and a peripheral edge, comprising the steps of:

mounting on a door frame a first skin forming the first face of the door;

mounting on the door frame a second skin forming the second face of the door; and shaping at least one of said first and second skins before mounting thereof on the door frame by vacuum forming to provide the corresponding face of the door with decorative patterns, said at least one skin being made of a moldable material for this purpose, the decorative patterns as well as the door frame being designed so that the vacuum forming shaped skin can be mounted on the door frame;

at least one of the first and second skins comprising a portion thereof constituting at least in part said peripheral edge of the door.

Preferably, a convenient material fills any empty space present between the first and second skins of the door, thereby increasing the rigidity of such a door.

The first and second skins may be jointed together by a heating process, the material constituting the first skin and the material constituting the second skin being then selected for this purpose.

The objects, advantages, and other features of the present invention will become more apparent from the following non-restrictive description of a preferred embodiment thereof, made in conjunction with the accompanying drawings in which:

DETAILED DESCRIPTION OF THE PREFERRED EMBODIMENT

Figure 1:
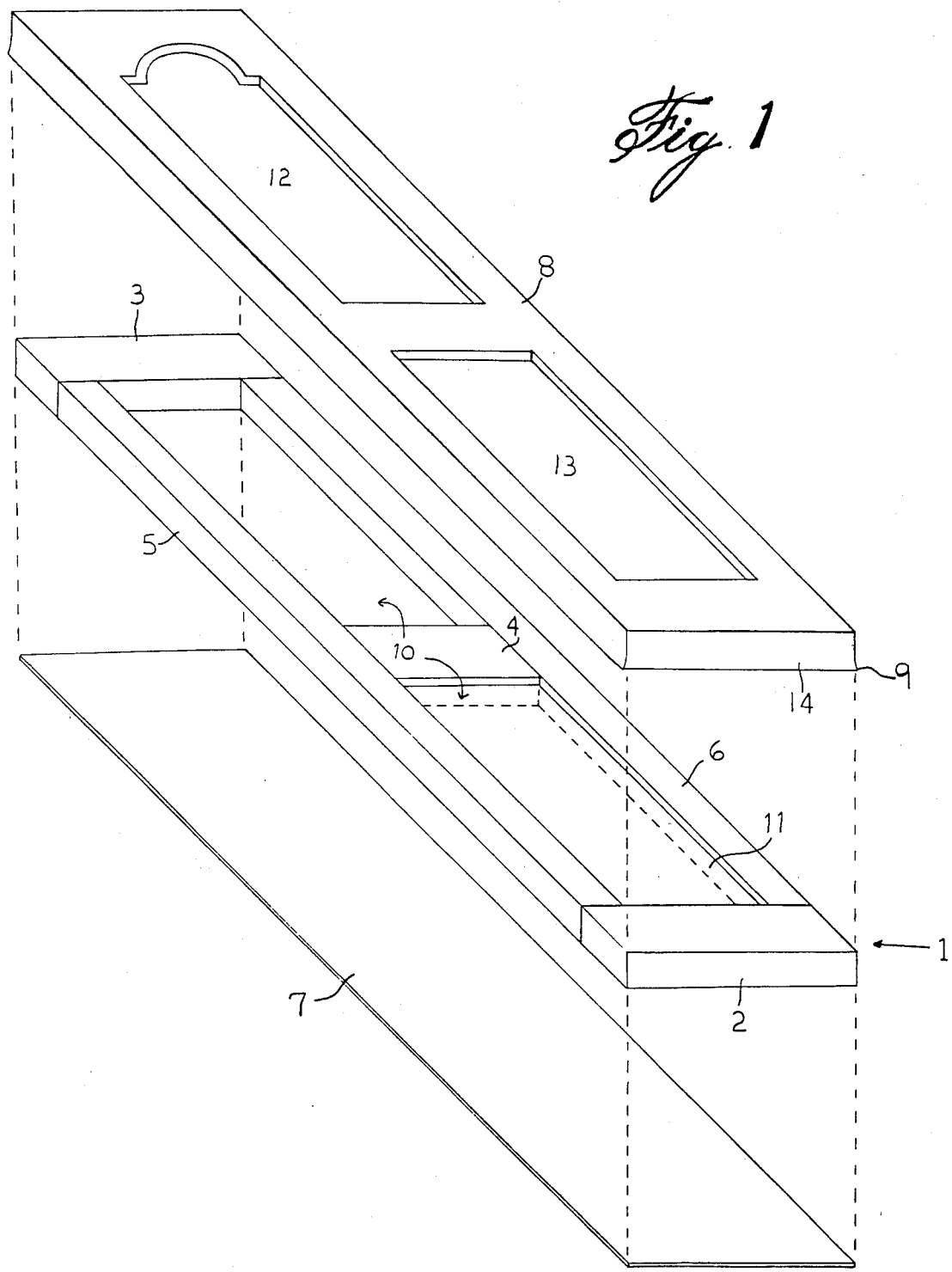
FIG. 1 shows the different non-assembled parts of an embodiment of the door according to the present invention, and how these different parts are assembled together.

As illustrated on FIG. 1, the door includes a rigid and sturdy frame 1 which can be advantageously made of light wood although other material can also be possibly used. This frame 1 comprises two stiles 5 and 6 and three cross-members 2, 3 and 4. These two stiles and these three cross-members can be assembled together in known manners for example with glue, with screws and/or with any suitable fastener. This frame 1 constitutes in fact the supporting structure of the door of the invention, as it will become clearer from the following description.

The door also comprises a molded skin 8 forming one of the two faces of the door and having a shape adapting with the shape of the frame 1 to recover the same. Such a skin 8 is preferably made of high impact polystyrene, of P.V.C. and/or of A.B.S., and is fixed on the frame 1 through contact glue.

The skin 8 can advantageously be shaped by vacuum forming to provide the corresponding face of the door with decorative patterns as illustrated schematically on FIG. 1. As it is well known, in such a vacuum forming process, a sheet of the material constituting the skin 8 is supported over a mold and is heated to a temperature at which it can be reshaped. This mold is provided with means permitting to establish a vacuum between the sheet and the mold that will pull in the softened sheet to the mold contour where it hardens to the desired shape.

Another skin 7 made of the same material as the skin 8 and forming the other face of the door is also mounted on the frame 1 through contact glue to achieve the external finish of the door. As illustrated on FIG. 1, the skin 7 is flat, which can be suitable in the case for example of bifold doors. However, for other types of doors, the skin 7 can be molded as well as the skin 8.

As shown on FIG. 1, the skin 8 comprises slightly rounded corners 9 to facilitate the mounting thereof on the frame 1. Obviously, after fitting of the skins 7 and 8 on the frame 1, these two skins can be treated through a heating process to joint together the two skins 7 and 8 and in order that the peripheral portion 14 of the skin 8 takes the exact shape of the peripheral edge of the frame 1 to constitute the peripheral edge of the door. Of course, the above-mentioned materials which can be used to form the skins 7 and 8 are convenient for this purpose.

In order to increase the rigidity of the door structure, a styrofoam panel or an honeycombed cardboard can be used to fill the spaces 10 between the skins 7 and 8 of the assembled door, as illustrated schematically at 11 on FIG. 1. It is also possible to fill these spaces 10 by injecting a polyurethane foam between the two skins 7 and 8.

A door as described with reference to FIG. 1 of the drawings have the following advantages over the conventional doors made of wood as described in the preamble of the present disclosure.

The materials, namely high impact polystyrene, P.V.C. and/or A.B.S., forming the skins 7 and 8 provide to the door of the invention a durable, scuff and scratch resistant, and maintenance free elegant finish.

The specific design of the door provides thereto a light weight for enabling to eliminate the need for a bottom track in the case of bifold doors.

The vacuum forming of at least the front skin 8 allows a wider range of design patterns to accommodate a greater variety of decors.

Such a door operates more quietly due to its specific design and is generally less expensive than wood doors.

The regions 12 and 13 of the door shown on FIG. 1 can comprise, for example, shatterproof mirrors in order to increase the appearance and the utility of the door.

It should also be noted that, as in the case of wood doors, the door of the invention can also be, if desired or necessary, painted with acrylic or latex water base paint, and trimmed for adaptation to thick carpet installation.

A preferred embodiment of the present invention has been described in detail with reference to FIG. 1 of the drawings. However, it should be noted that any modification to such an embodiment within the scope of the appended claims is not deemed to change the object and nature of the invention.

The embodiments of the invention in which an exclusive property or privilege is claimed are defined as follows:

1. A method for constructing a door having a first face provided with decorative patterns, a second face and a peripheral edge, comprising the steps of:
   building a door frame;
   shaping a sheet of moldable material by vacuum forming in order to produce a first skin designed to fit on the door frame, said first skin comprising a frontal surface defining said first face of the door provided with decorative patterns and at least one peripheral surface defining at least in part said peripheral edge of the door;
   fixedly mounting said first skin on the door frame; and
   fixedly mounting a second skin on the door frame, said second skin forming said second face of the door.

2. A method according to claim 1, wherein the step of building the door frame comprises the step of assembling together a first stile and a second stile through three cross-members.

3. A method according to claim 1, in which the door frame is made of wood.

4. A method according to claim 1, in which said first and second skins are both made of a same moldable material.

5. A method according to claim 1, wherein said moldable material comprises one of the following materials: a high impact polystyrene, P.V.C. and A.B.S.

6. A method according to claim 1, in which at least one empty space is present between the first and second skins of said door, said method comprising the step of filling said empty space with a filling material.

7. A method according to claim 6, wherein said filling material comprises a styrofoam panel.

8. A method according to claim 6, wherein said filling material comprises honeycombed cardboard.

9. A method according to claim 6, wherein said filling material comprises an injected polyurethane foam.

10. A method according to claim 1, wherein said mounting steps comprise gluing said first and second skins on said door frame.

11. A method according to claim 1, in which said vacuum forming shaping step comprises the steps of:
    supporting said sheet of moldable material over a mold;
    heating said sheet to a temperature at which said moldable material can be reshaped; and
    establishing a vacuum between the sheet and the mold, said vacuum pulling in the heated sheet to the mold where this sheet hardens to a desired shape to form said first shaped skin.

12. A method according to claim 1, further comprising the step of joining said first and second skins together by a heating process, the moldable material constituting the first skin and the material constituting the second skin being selected for this purpose.

* * * * *